US010623575B1

(12) United States Patent
Synal (10) Patent No.: US 10,623,575 B1
(45) Date of Patent: Apr. 14, 2020

(54) PARTICIPANT IDENTIFICATION FOR TELECONFERENCING

(71) Applicant: T-Mobile USA, Inc., Bellevue, WA (US)

(72) Inventor: Adrian Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/215,535

(22) Filed: Dec. 10, 2018

(51) Int. Cl.
| H04M 1/56 | (2006.01) |
| H04M 15/06 | (2006.01) |
| H04M 3/42 | (2006.01) |
| H04M 3/56 | (2006.01) |
| H04L 29/06 | (2006.01) |

(52) U.S. Cl.
CPC ........ *H04M 3/563* (2013.01); *H04L 63/0823* (2013.01); *H04L 63/0876* (2013.01); *H04M 3/42059* (2013.01); *H04M 2203/5081* (2013.01); *H04M 2203/6027* (2013.01)

(58) Field of Classification Search
None
See application file for complete search history.

(56) References Cited

U.S. PATENT DOCUMENTS

| 6,826,270 | B1 * | 11/2004 | Welch | ............... | H04M 3/42042 |
| | | | | | 379/142.06 |
| 6,937,713 | B1 * | 8/2005 | Kung | ...................... | H04M 3/54 |
| | | | | | 379/199 |
| 7,280,647 | B2 * | 10/2007 | Henderson | ............ | H04M 1/576 |
| | | | | | 379/142.01 |
| 7,995,727 | B1 * | 8/2011 | Chmara | .................. | H04M 1/57 |
| | | | | | 370/352 |
| 9,203,954 | B1 * | 12/2015 | Van Rensburg | .. | H04M 3/42042 |
| 2004/0125932 | A1 | 7/2004 | Orbach et al. | | |
| 2006/0222155 | A1 | 10/2006 | Summers et al. | | |
| 2008/0117838 | A1 | 5/2008 | Yee et al. | | |
| 2010/0215162 | A1 * | 8/2010 | Gupta | ...................... | H04M 3/56 |
| | | | | | 379/142.06 |
| 2019/0068783 | A1 * | 2/2019 | Archer | ............... | H04M 3/4365 |

OTHER PUBLICATIONS

European Application No. 19204628.2, Extended European Search Report dated Feb. 3, 2020, 9 pages.

* cited by examiner

*Primary Examiner* — Quoc D Tran
(74) *Attorney, Agent, or Firm* — Han Santos, PLLC (57) ABSTRACT

Techniques and examples pertaining to identifying a participant of a teleconference using a telephone number or an Internet protocol (IP) address are described. A method for teleconferencing participant identification may involve receiving an IP-based telephone call that includes a telephone number or an IP address. The method may also involve querying databases with the telephone number or the IP address to obtain identifications associated with the telephone number or the IP address. The method may also involve determining a display name for the IP-based telephone call based on the identifications, as well as connecting the IP-based telephone call as a participant to a teleconference that includes other participants. The method may further involve transmitting the display name to a device associated with at least one of the other participants of the teleconference.

19 Claims, 6 Drawing Sheets

PARTICIPANT IDENTIFICATION FOR TELECONFERENCING

BACKGROUND

Contemporary telecommunication technologies have enabled various client-based teleconference applications that involve data transfer over the Internet. Participants of a teleconference are not required to be physically in a same location (hereinafter "a physical meeting"), such as a conference room or a meeting hall. Rather, some or all of the participants may be located remotely from each other, and yet through teleconferencing are still able to virtually "meet" each other, namely, to communicate in a real-time manner as if they were physically together. In general, teleconferencing employs technologies to present at least the voice of each participants to all other participants during the meeting. In many cases, teleconferencing may also at the same time live-stream video data (e.g., real-time motion or facial expression) of one or more participants to other participants. In either case, a caller may call into a teleconference using a calling device, such as a telephone, to join the teleconference as a participant. Examples of teleconference applications include, but are not limited to, telephone teleconferencing, videoconferencing, web conferencing, augmented reality conferencing, and the like.

Nevertheless, a teleconference poses a major difficulty as compared to a physical meeting. It is important, regardless a meeting is conducted as a teleconference or a physical meeting, to identify who each of the participants is. However, when a caller makes a telephone call and attempts to attend a teleconference, it is not always trivial for a host of the teleconference and/or other participants to identify who the caller is. Even if the caller identifies himself/herself at one time during the meeting, the caller may be listed on a teleconference interface as "Caller No. 1", "Caller No. 2", or similar identifications with little meaning. Also, as compared to the case of a physical meeting, it is often not as clear to a new participant who other participants are in a teleconference, especially for those participants who present themselves only by his/her voice and without video streaming. As a result, the efficiency and meeting quality of teleconferences is often compromised due to inability of identifying new or existing meeting participants in a timely manner.

In addition, as compared to the case of a physical meeting, it is not as obvious to existing participants of a teleconference when there is a new participant attending the meeting. For example, existing meeting participants may not notice a new participant who is listed as nothing but "Caller No. 3" on a teleconferencing device or facility. Consequently, a person who is not supposed to be in a teleconference may be sitting in a meeting without being noticed by other participants.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

As mentioned above, there is a problem of participant identification for client-based teleconferencing. Aspects of the present disclosure address this problem. Further details are described below.

This disclosure is directed to techniques for identifying a participant of a teleconference when the participant makes a telephone call via a calling device to attend the teleconference. Depending on the type of the calling device used, the telephone call may include an associated telephone number, an associated IP address, or both. A teleconference server receiving the telephone call may use the telephone number and/or the IP address included in the telephone call to identify the telephone call, or rather, the participant who is making the telephone call. Specifically, the teleconference server may transmit the telephone number and/or the IP address to a variety of databases for querying. A few identifications of the participant may be provided by the databases, and the teleconference server may designate one of the identifications provided as a display name for the telephone call. The teleconference server may subsequently broadcast the display name to other participants of the teleconference. The display name may be used to identify the participant during the teleconference.

A short setup time for a teleconference participant is usually desired. Namely, it is generally an expectation of a caller calling to attend a teleconference meeting that he or she can be connected to the meeting as quickly as possible. The techniques according to the present disclosure enable the teleconference server to identify, in a timely and seamless manner, a caller calling to attend a teleconference meeting, even if the caller does not identify himself/herself, thereby shortening the setup time. The techniques also enable the teleconference server to maintain a list of participants for every teleconference that is being hosted or otherwise served by the teleconference server. The techniques further enable the teleconference server to update one or more of the databases with the most recently used identification associated with the telephone number or the IP address.

The ability for a teleconference server to identify a caller calling into a meeting in a timely manner with accuracy is crucial to the operational efficiency of the meeting. The techniques described in the present application enable the teleconference server to identify the caller without a need for the caller to explicitly identify himself/herself, thereby shortening the time for the caller to be admitted to the meeting as a new participant. Moreover, this ability enables other participants of the meeting to be informed of the identity of a new participant as soon as he/she joins the meeting, as if all the participants were meeting face-to-face. As a consequence, the meeting can be run seamlessly without wasting time in identifying a new participant every time a new participant joins the meeting. The saved time and enhanced efficiency result in lower operation cost and improved user experience of teleconferencing provided by the teleconference server.

The techniques described herein may be implemented in a number of ways. Example implementations are provided below with reference to the following figures.

Example Architecture and Operation Principles

Figure 1:
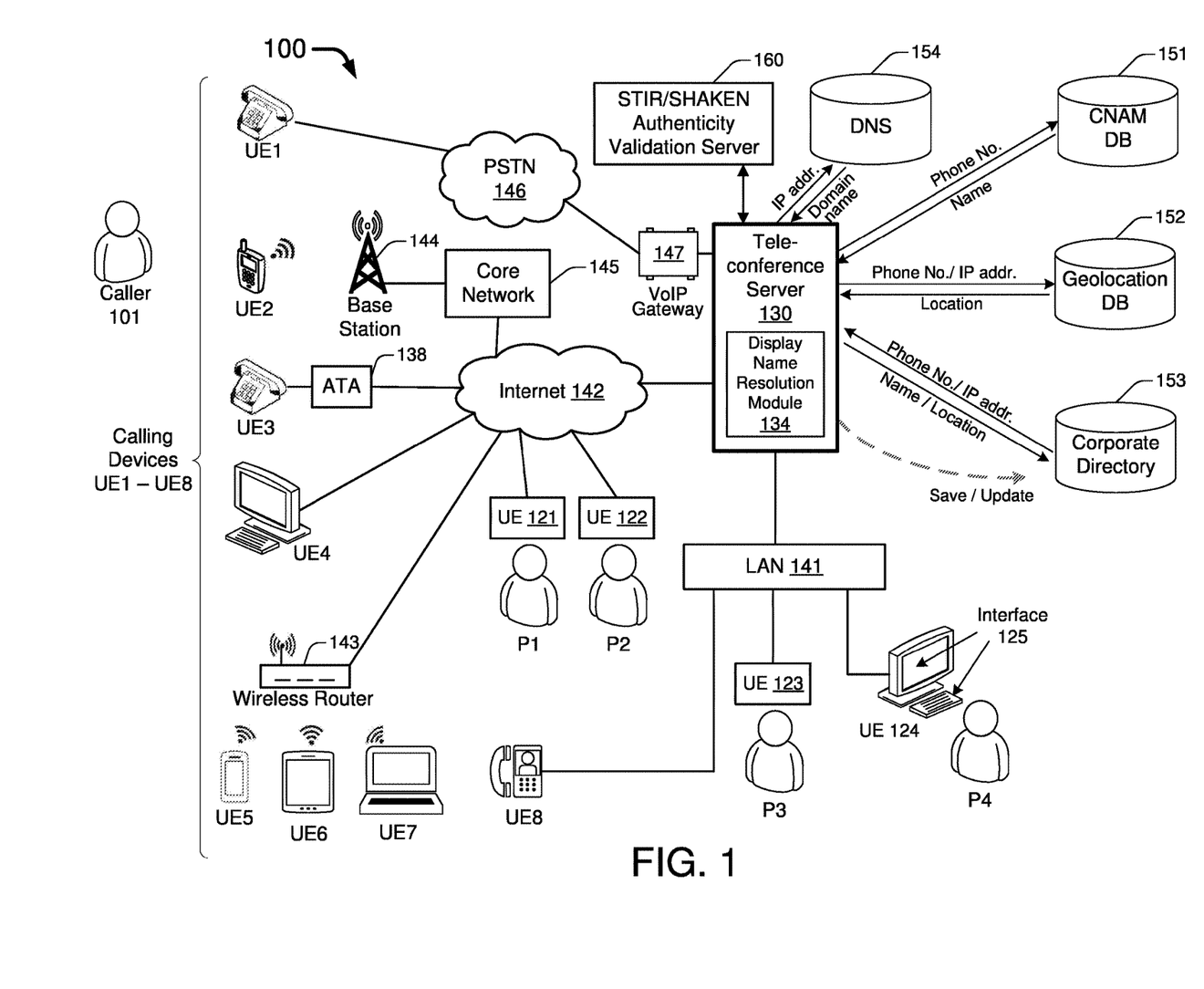
FIG. 1 illustrates an example network architecture for identifying a participant of a teleconference.

FIG. 1 illustrates an example architecture of a telecommunication network 100 that enables a teleconferencing service. The teleconferencing service may serve a plurality of users as participants of a teleconference. The participants may or may not be physically located close to each other. For instance, some of the participants may be working in a same office building in Europe, while some of the participants may be located as remotely as several time zones away from the office building, such as in America or Asia. Through the teleconferencing service provided by network 100, the participants may have a teleconference as if they were having a face-to-face meeting in a conference room.

Telecommunication network 100 may include a multipoint control unit (MCU), such as teleconference server 130 that hosts the teleconference. Each of the participants is communicatively coupled with, or "connected to", teleconference server 130 to send and receive voice, text, and/or video data to and from teleconference server 130. Teleconference server 130 may continuously broadcast the voice and/or video data received from each participant to other participants of the teleconference, thereby providing the teleconferencing service. For example, teleconference server 130 may be hosting a teleconference which has users P1, P2, P3 and P4 of FIG. 1 as participants. Teleconference server 130 may be capable of hosting a plurality of teleconferences for different groups of users simultaneously. In some examples, teleconference server 130 may provide any form of network or internet-based teleconferencing services, such as telephone teleconferencing, videoconferencing, web conferencing, and augmented reality conferencing. In some examples, the teleconferencing services provided by teleconference server 130 are accessible by a participant (i.e., user) via client-based application.

Each of the participants of the teleconference may, respectively, be communicatively coupled with teleconference server 130 using a user equipment (UE) that is carried by or otherwise physically located with the respective participant. As shown in FIG. 1, participant P1 is connected to teleconference server 130 using UE 121, whereas participants P2, P3 and P4 are connected to teleconference server 130 using UE 122, UE 123 and UE 124, respectively. UE 123 and UE 124 may belong to a same local area network (LAN) 141 as teleconference server 130. Namely, each of UE 123, UE 124 and teleconference server 130 may be connected to LAN 141. A UE is generally capable of sending and receiving data such as voice, audio, video, text, and/or other types of multimedia messages. For instance, each of UE 123 and UE 124 may be a personal computer or an Internet Protocol (IP) telephone. On the other hand, participants P1 and P2 may be remote from a location of LAN 141, and may respectively use UE 121 and UE 122, such as a laptop computer or a tablet device, to connect to teleconference server 130 via Internet 142.

It should be noted that data transmitted between teleconference server 130 and each of UE 121, UE 122, UE 123 and UE 124 are IP-based. For example, a voice signal transmitted over LAN 141 and Internet 142 is in the form of IP packets that are encapsulated according to the Internet protocol employed by telecommunication network 100. Various UEs are inherently IP-based equipment, such as desktop computer UE4, personal communication device UE5, tablet device UE6, laptop computer UE7 and IP telephone UE8. These IP-based UEs are readily capable of transmitting and receiving data in the form of IP packets. For example, desktop computer UE4 may be communicatively coupled to teleconference server 130 via Internet 142, which performs an IP-based communication. Likewise, IP telephone UE8 may be communicatively coupled to teleconference server 130 via LAN 141, which also conducts an IP-based communication. Each of personal communication device UE5, tablet device UE6 and laptop computer UE7 may initiate an IP-based communication with teleconference server 130 by wirelessly connecting to wireless router 143 that is communicatively coupled to teleconference server 130 via Internet 142. Contemporary cellular telephones compliant to digital wireless communication standards such as Global System for Mobile communications (GSM), Long-Term Evolution (LTE) and Worldwide Interoperability for Microwave Access (WiMAX) are also IP-based. Cellular telephone UE2 may be such a cellular telephone, and may thus have an IP-based communication with teleconference server 130 by wirelessly connecting to base station 144 of a cellular telephone carrier that is connected to core network 145 of the cellular telephone carrier. Core network 145 may subsequently communicatively couple to teleconference server 130 via Internet 142.

Although teleconferencing realized by telecommunication network 100 involves mostly IP-based operations, a user may use a conventional analog telephone, such as a Public Switched Telephone Network (PSTN) telephone, to access the teleconference service. A PSTN telephone may be enabled to access the teleconferencing service with the assistance from a Voice-over-IP (VoIP) gateway on the teleconference server end or an analog telephone adaptor (ATA) on the PSTN telephone end. For example, a PSTN telephone UE1 may connect to teleconference server 130 via PSTN 146 and VoIP gateway 147. Specifically, a telephone call initiated from PSTN telephone UE1 may transmit an analog voice signal over PSTN 146 to VoIP gateway 147, which may convert the analog voice signal into IP packets and subsequently send the IP packets to teleconference server 130. Reversely, IP-based voice data may be transmitted from teleconference server 130 to VoIP gateway 147, which may convert the IP-based voice data into an analog voice signal and subsequently transmit the analog voice signal to PSTN telephone UE1 via PSTN 146. Similarly, a PSTN telephone UE3 may connect to ATA 138, which may convert an analog voice signal of PSTN telephone UE3 into IP packets and subsequently send the IP packets to teleconference server 130 via Internet 142. Reversely, IP-based voice data may be transmitted via Internet 142 from teleconference server 130 to ATA 138, which may subsequently convert the IP-based voice data into an analog voice signal that can be picked up by PSTN telephone UE3.

When someone intends to attend a teleconference, he or she may use one of the calling devices mentioned above to initiate an IP-based telephone call to teleconference server 130. For example, caller 101 may intend to attend a teleconference that is having users P1-P4 as participants. Caller 101 may use one of user equipment UE1-UE8 as a calling device to make an IP-based telephone call to teleconference server 130, and thus become connected to teleconference server 130 as described above. The IP-based telephone call may include a telephone number (e.g., an E.164 format telephone number), or an IP address, that is associated with the calling device. For example, caller 101 may use PSTN telephone UE1 or cellular telephone UE2 to initiate an IP-based telephone call, which may include a telephone number of PSTN telephone UE1 or cellular telephone UE2. Alternatively, caller 101 may use desktop computer UE4, personal communication device UE5, tablet device UE6 or laptop computer UE7 to initiate an IP-based telephone call, which may include an IP address of desktop computer UE4 or an IP address of wireless router 143. In some embodiments, an IP-based telephone call made by caller 101 may include both a telephone number and an IP address. For example, if caller 101 makes an IP-based telephone call using PSTN telephone UE3, the IP-based telephone call may include both a telephone number of UE3 as well as an IP address of ATA 139. Likewise, if caller 101 makes the IP-based telephone call using IP telephone UE8, then the IP-based telephone call may include both a telephone number of UE8 as well as an IP address of UE8. In some embodiments, caller 101 may use a calling device running a softphone program, i.e., a software application that provides a user interface mimicking an actual telephone. For example, caller 101 may make the IP-based telephone call to teleconference server 130 using a softphone application running on tablet device UE6, and the IP-based telephone call may thus include a telephone number that is set up in the softphone application running on tablet device UE6, as well as the IP address of wireless router 143.

Based on either or both the telephone number and the IP-address that are included in the IP-based telephone call made by caller 101 using one of user equipment UE1-UE8, teleconference server 130 may determine a display name for the IP-based telephone call, thereby identifying caller 101 in the teleconference using the display name. To achieve this end, telecommunication network 100 may further include one or more databases (DBs) from which teleconference server 130 may obtain identifications of caller 101. As shown in FIG. 1, teleconference server 130 may access databases such as Caller Identification Name (CNAM) database 151, geolocation database 152, corporate directory 153 and/or domain name system (DNS) 154 to obtain one or more identifications of caller 101. Each of the identifications may be a person's name, a business name, a geolocation, or a network domain name that is associated with either the calling device used by caller 101 or caller 101 himself/herself. Each of the databases 151-154 may store entries of such identifications for many telephone numbers and/or IP addresses, and teleconference server 130 may query one or more of the databases with a telephone number and/or an IP address to obtain one or more identifications of a person's name, a business name, a geolocation, and/or a network domain name that is associated with the telephone number and/or the IP address. Specifically, CNAM database 151 may store entries of a person's name or a business name under which a calling device is registered. Geolocation database 152 may store entries of a location (e.g., a country, a state, a city, or a specific street address) with which a telephone number and/or an IP address is associated. Corporate directory 153, which may be specific to a host of a teleconference (e.g., a company or an organization), may store entries of a name of a person or a business which a telephone number and/or an IP address is associated with. The person or the business may be a client, a supplier, an employee, a business partner, or someone/some entity who has been related to the company/organization in a business sense. DNS 154 may store entries of a domain name which an IP address is associated with. A domain name is an identification string that defines a realm of administrative autonomy, authority or control within the Internet. For example, a domain name of "uspto.gov" may indicate the IP address is within a realm of administrative authority of United States Patent and Trademark Office, whereas a domain name of "wa.gov" may indicate the IP address is within a realm of administrative authority of State of Washington government of the United States.

When receiving an IP-based telephone call from a calling device, teleconference server 130 may query databases 151-154 with a telephone number and/or an IP address included in the IP-based telephone call. Databases 151-154 may, upon being queried by conference server 130, search through the entries stored therein, and, based on the search result, respond by providing teleconference server 130 with one or more identifications associated with the telephone number or the IP address. For example, when queried by teleconference server 130 with the telephone number, CNAM database 151 may search through the entries stored therein and respond to teleconference server 130 by providing a person's name or a business name that is registered under the telephone number in CNAM database 151. As another example, when queried by teleconference server 130 with the IP address, DNS 154 may search through the entries stored therein and respond to teleconference server 130 by providing a domain name associated with the IP address in DNS 154. Likewise, when queried by teleconference server 130 with the telephone number and/or the IP address, each of geolocation database 152 and corporate directory 153 may search through the entries stored therein and provide teleconference server 130 with a person's name, a business name, or a location that is associated with the telephone number and/or the IP address in geolocation database 152 or corporate directory 153. In practical applications, teleconference server 130 is not limited to querying only one database. That is, when receiving the IP-based telephone call, teleconference server 130 may query more than one of databases 151-154 with the telephone number and/or the IP address to obtain one or more associated identifications.

As shown in FIG. 1, teleconference server 130 may include a display name resolution module 134 therein. In an event that more than one identification is provided by databases 151-154 upon the querying, display name resolution module 134 may, based on the plurality of identifications obtained from databases 151-154, determine a display name for caller 101. Accordingly, teleconference server 130 may identify caller 101 during the teleconference using the display name as determined by display name resolution module 134. Display name resolution module 134 may determine the display name by choosing or otherwise selecting an identification out of the plurality of identifications obtained. The chosen display name is deemed by name resolution module 134 to be most appropriate to refer to or otherwise identify caller 101 during the teleconference. In some embodiments, display name resolution module 134 may alternatively generate for caller 101 a display name that is different than any of the plurality of the identifications obtained from databases 151-154.

In some embodiments, entries stored in one or more of databases 151-154 may have a respective timestamp indicating a date and a time that the entry is most recently entered or updated in the respective database. For example, a telephone number "987-1111" may belong to a telephone that has been used by several different employees of a company over the years, and thus corporate directory 153 of the company may have several entries each associating the phone number "987-1111" with a respective name of one of the employees. Each of the entries may be entered on a different date when the respective employee started to use the telephone number, and thus have a different timestamp indicating the date the respective entry was registered in corporate directory 153. Teleconference server 130 may thus, upon querying corporate directory 153 with the telephone number "987-1111" that is included in an IP-based telephone call, obtain from corporate directory 153 a plurality of identifications associated with the telephone number "987-1111", with each identification having an employee's name corresponding to a respective one of the entries, as well as the timestamp of that specific entry. Display name resolution module 134 may determine the display name for the IP-based telephone call based on the timestamps of the plurality of the identifications obtained. Namely, display name resolution module 134 may sort the plurality of identifications based on the timestamps and designate the identification having a most recent timestamp as the display name for the IP-based telephone call. In an alternative scenario, a plurality of identifications each having a timestamp may be obtained from more than one of databases 151-154. For example, a client of the company may have a cellular telephone that has a telephone number "987-2222". Upon querying databases 151-154, teleconference server 130 may obtain a first identification associated with the telephone number "987-2222" from CNAM database 151 having a first timestamp, as well as a second identification associated with the telephone number "987-2222" from corporate directory 153 having a second timestamp that is more recent than the first timestamp. Display name resolution module 134 may thus designate the second identification associated with the telephone number "987-2222" as the display name for an IP-based telephone call that includes the telephone number "987-2222".

In some embodiments, in an event that teleconference server 130 obtains a plurality of identifications associated with a telephone number, display name resolution module 134 may determine the display name for an IP-based telephone call based on a completeness of the plurality of the identifications obtained. Specifically, a respective completeness level may be determined for each of the plurality of the identifications, and display name resolution module 134 may designate one identification having the highest completeness level as the display name. In some embodiments, the completeness level may be determined based on a total number of fields the respective identification possesses. For example, upon querying databases 151-154 with a telephone number "987-3333" included in an IP-based telephone call that is received, teleconference server 130 may obtain a first identification associated with the telephone number "987-3333" that has simply a given name, "John", from corporate directory 153, as well as a second identification associated with the telephone number "987-3333" that has a given name, a family name, and a business name, "John Smith, ABC Interior Design", from CNAM database 151. Display name resolution module 134 may thus designate the second identification associated with the telephone number "987-3333" as the display name for the IP-based telephone call, as the second identification, "John Smith, ABC Interior Design", possesses more fields than the first identification, and thus has a higher completeness level.

In some embodiments, in an event that teleconference server 130 obtains from more than one databases a plurality of identifications associated with a telephone number, display name resolution module 134 may determine the display name for an IP-based telephone call based on a predetermined priority of the databases. Namely, display name resolution module 134 may designate as the display name one of the plurality of identifications that is obtained from a most preferred database of the plurality of databases. For example, teleconference server 130 may keep a predetermined priority of databases 151-154, such as "corporate directory 153 is preferred over CNAM database 151, which is preferred over geolocation database 152, which is preferred over DNS 154". When the plurality of identifications is obtained from more than one of databases 151-154, display name resolution module 134 may designate as the display name one of the plurality of identifications according to the predetermined priority of databases 151-154. For instance, if teleconference server 130 queries databases 151-154 with an IP address '987.6154.32.1' that is included in an IP-based telephone call received, and subsequently obtains a first identification from geolocation database 152, a second identification from corporate directory 153, and a third identification from DNS 154, display name resolution module 134 may, according to the predetermined priority of databases 151-154 stated above, designate the second identification as the display name for the IP-based telephone call, as the second identification is obtained from corporate directory 153, which has a higher priority than geolocation database 152 and DNS 154, from which the first and third identifications are obtained.

In some embodiments, teleconference server 130 may employ more than one procedure stated above in the determining of the display name when a plurality of identifications is obtained. Specifically, display name resolution module 134 of teleconference server 130 may resort to one procedure to achieve a resolution of the display name before resorting to another procedure. For instance, display name resolution module 134 may try to determine a display name by firstly using the predetermined database priority as described above. In an event that the plurality of identifications is obtained from a same database, display name resolution module 134 may compare the timestamps of the plurality of identifications. In an event that none of the plurality of identifications includes a timestamp, display name resolution module 134 may compare the completeness levels of the plurality of identifications.

In some embodiments, it is possible that a database queried by teleconference server 130 responds by providing teleconference server 130 with an identification that is not meaningful. That is, due to possibly corrupted or misplaced data entries stored therein, the database may provide teleconference server 130 with an identification that is irrelevant or meaningless. For example, corporate directory 153 may store an entry that associates a specific telephone number with an order number placed by a customer, instead of a person's name or a business name, and thus provide the order number to teleconference server 130 when queried with the specific telephone number. The order number is thus a meaningless identification to teleconference server 130 for the specific telephone number. It is also possible that the database responds with a null identification (e.g., a null text string) or a default identification or message that is not meaningful to be used as a display name, or simply does not respond to teleconference server 130 at all. For instance, a business partner who does business with a company for the first time may initiate a telephone call that has a telephone number that is not currently stored in corporate directory 153 of the company. Corporate directory 153 may thus not be able to find an entry stored therein that associates with the telephone number, and simply does not provide teleconference server 130 with an identification at all. Alternatively, corporate directory 153 may respond with a default response as an identification, such as "phone number not found", which is apparently not a meaningful identification to teleconference server 130 for the specific telephone number. In some embodiments, teleconference server 130 may analyze the one or more identifications obtained from databases 151-154 to determine whether they are meaningful to present as a display name. In an event that none of the one or more identifications is determined to be meaningful, display name resolution module 134 would thus not present any of the identifications obtained as the display name. Rather, display name resolution module 134 may simply designate the telephone number or the IP address as the display name for the IP-based telephone call.

Also shown in FIG. 1 is an authenticity validation server 160 that employs Secure Telephony Identity Revisited and Secure Handling of Asserted Information using Tokens (STIR/SHAKEN). There may be a scenario that someone who is not supposed to attend a teleconference, such as a corporate spy, may attempt to attend the teleconference by disguising himself/herself as someone else. This may be done by initiating a telephone call to teleconference server 130 from an altered calling device. Since the calling device has been altered, authenticity of the identity of the caller is compromised, and the telephone call may present itself as having a telephone number that is not genuine. In some embodiments, an IP-based telephone call may include an authentication certificate in addition to a telephone number, and authenticity validation server 160 may be used by teleconference server 130 to validate the authentication certificate upon receiving it. If authenticity validation server 160 is not able to validate the authentication certificate to be genuine or authentic, teleconference server 130 would not connect the telephone call to the teleconference. That is, teleconference server 130 would connect an IP-based telephone call to a teleconference only after an authentication certificate of the IP-based telephone is verified to be authentic by authenticity validation server 160. In some alternative embodiments, if authenticity validation server 160 is not able to validate the authentication certificate as genuine or authentic, teleconference server 130 may still connect the telephone call to the teleconference, but with the display name of the caller labeled as "unvalidated" to inform other participants of the teleconference that this particular caller is calling with an unvalidated authentication certificate.

Figure 2:
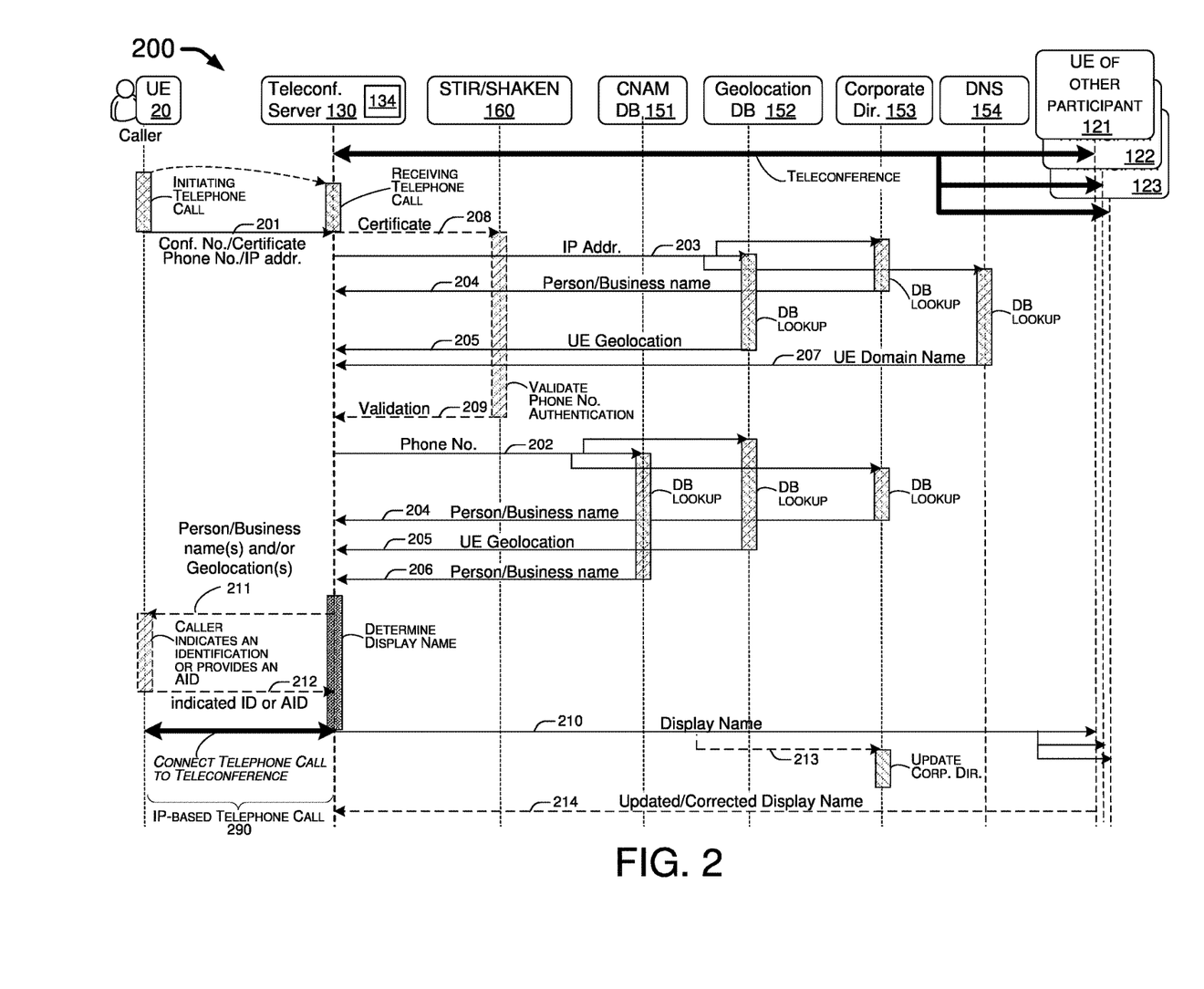
FIG. 2 is a data flow chart illustrating data or information passed among various apparatuses of FIG. 1 in a process of joining a participant to a teleconference.

Operation principles of teleconference server 130 of FIG. 1, including display name resolution module 134 thereof, may be further described with assistance of a data flow chart 200 of FIG. 2. Data flow chart 200 illustrates data or information that is passed among various apparatuses of FIG. 1 in a process of joining a participant to a teleconference.

As illustrated in data flow chart 200, teleconference server 130 may be hosting a teleconference that has users P1, P2 and P3 of FIG. 1 as participants, who may be connected to teleconference server 130 via UE 121, UE 122 and UE 123 of FIG. 1, respectively. Teleconference server 130 may assign for the teleconference a conference number that uniquely identifies the teleconference among all teleconferences that teleconference server 130 may be hosting concurrently. A caller, such as caller 101 of FIG. 1, may place an IP-based telephone call 290 that is received by teleconference server 130. The caller may use UE 20, which may be any of UE1-UE8 of FIG. 1, to place IP-based telephone call 290. IP-based telephone call 290 may include the conference number, which indicates to teleconference server 130 a teleconference the caller intends to attend. In addition, IP-based telephone call 290 may also include a telephone number and/or an IP address associated with IP-based telephone call 290, as described above. In some embodiments, IP-based telephone call 290 may further include a certificate (i.e., an authentication certificate) that may be validated by a STIR/SHAKEN server. Represented by data flow 201, the conference number, the certificate, the telephone number, and/or the IP address may be transmitted from UE 20 to teleconference server 130 as part of IP-based telephone call 290.

Subsequently, teleconference server 130 may query one or more databases (e.g., databases 151-154) with the telephone number and/or the IP address. Represented by data flow 202, the telephone number may be transmitted from teleconference server 130 to each of CNAM database 151, geolocation database 152 and corporate directory 153 for the querying. Represented by data flow 203 of FIG. 2, the IP address may be transmitted from teleconference server 130 to each of geolocation database 152, corporate directory 153 and DNS 154 for the querying.

Upon receiving the telephone number and/or the IP address from teleconference server 130, databases 151-154 may respectively search or look up entries stored therein and see if one or more identifications associated with the telephone number and/or the IP address may be found among the entries. Upon finding such an entry, databases 151-154 may transmit back to teleconference server 130 a person's name, a business name, a geolocation, and/or a network domain name that is associated with the telephone number and/or the IP address. For example, as represented by data flow 204, a person's name and/or a business name may be transmitted from corporate directory 153 to teleconference server 130 as an identification associated with the telephone number and/or the IP address. Similarly, as represented by data flow 205, a geolocation, such as a geolocation of UE 20, may be transmitted from geolocation database 152 to teleconference server 130 as an identification associated with the telephone number and/or the IP address. Represented by data flow 206, a person's name and/or a business name may be transmitted from CNAM database 151 to teleconference server 130 as an identification associated with the telephone number. Also, as represented by data flow 207, a network domain name, such as a network domain name of UE 20, may be transmitted from DNS 154 to teleconference server 130 as an identification associated with the IP address.

In some embodiments, IP-based telephone call 290 may include an explicit geolocation information of UE 20, which is transmitted as part of data flow 201 to teleconference server 130. For example, UE 20 may have a built-in global positioning system (GPS), which is capable of identifying exact three-dimensional Cartesian coordinates of UE 20. The coordinates of UE 20 may then be included in data flow 201 and transmitted to teleconference server 130 such that teleconference server 130 is able to know the exact geolocation of UE 20 without querying a geolocation database such as geolocation database 152.

In some embodiments, data flow 201 may include other information that may be used by teleconference server 130 to find the geolocation of UE 20. For example, UE 20 may be a cellular phone, and the location information of UE 20 may be inferred by a location of a cell tower or a base station to which UE 20 is connected in placing IP-based telephone call 290. That is, an identification of the cell tower may be included in data flow 201 and transmitted to teleconference server 130. Teleconference server 130 may query geolocation database 152 with the identification of the cell tower to find an approximate location of UE 20.

In some embodiments, teleconference server 130 may validate whether or not IP-based telephone call 290 as received from UE 20 is authentic. Namely, data flow 201 may also include an authentication certificate, as described above. Teleconference server 130 may pass the authentication certificate to STIR/SHAKEN authenticity validation server 160 after receiving the authentication certificate from UE 20, as represented by data flow 208. Authentication validation server 160 may validate the authentication certificate to be authentic, and then send a validation to teleconference server 130, as represented by data flow 209. Teleconference server 130 may proceed to determine a display name for IP-based telephone call 290 after receiving the validation, which validates the authentication certificate of IP-based telephone call 290 to be authentic.

Teleconference server 130 may subsequently determine a display name for IP-based telephone call 290 to identify or otherwise represent the caller as a participant of the teleconference. Specifically, display name resolution module 134 of teleconference server 130 may determine the display name based on the identifications (represented by data 204-207) received from databases 151-154 using one or more of the procedures as described above. Teleconference server 130 may connect IP-based telephone call 290 to the teleconference having the conference number such that the caller may join the teleconference as a participant. Teleconference server 130 may maintain a list of the participants of the teleconference, the list comprising a record of all the participants of the teleconference along with their respective display names. The maintaining of the list may include transmitting or otherwise broadcasting the display name to devices associated with other participants. Namely, teleconference server 130 may transmit the display name to UE 121, UE 122, and UE 123 (represented by data flow 210 in FIG. 2) so that existing participants P1, P2 and P3 may identify the caller during the teleconference using the display name.

In some embodiments, teleconference server 130 may consult the caller in the determining of the display name. Specifically, teleconference server 130 may present the plurality of identifications (i.e., the name(s) and/or geolocation(s) represented by data 204-207) received from databases 151-154 to the caller, and then receive from the caller an indication of one of the identifications that the caller intends to use as the display name during the teleconference. For example, teleconference server 130 may transmit the plurality of identifications to UE 20, as represented by data flow 211 in FIG. 2. The plurality of identifications may be presented to the caller in either an audio form or a visual form, depending on the capability of UE 20. The caller may then indicate which of the plurality of identification he/she intends to use as the display name, and such an indication may be transmitted from UE 20 to teleconference server 130, as represented by data flow 212. For example, UE 20 may be a PSTN telephone, and the plurality of identification may be sequentially presented to the caller in a voice, such as "If you would like to attend the meeting as 'John Smith', press or say one. If you would like to attend the meeting as 'ABC Interior Design', press or say two. If you would like to attend the meeting as 'Tokyo, Japan', press or say three." The caller may say "one" as the indication and the indication is transmitted as data flow 212 to teleconference server 130. Display name resolution module 134 of teleconference server 130 may then determine accordingly to use "John Smith" as the display name for IP-based telephone call 290.

In some embodiments, teleconference server 130 may present, in data flow 211, additional identifications other than the identifications as received from databases 151-154 in data flows 204-207. Specifically, display name resolution module 134 may, based on the identifications received from databases 151-154, generate additional identifications (e.g., composite identifications based on the identifications received) that may be sent in data flow 211 for the caller to consider. For example, display name resolution module 134 may receive "John Smith" from CNAM database 151, "ABC Interior Design" from corporate directory 153, and "Tokyo, Japan" from DNS 154, and subsequently composite them into additional identifications such as "John Smith, ABC Interior Design", "John Smith from Tokyo, Japan", "John Smith, ABC Interior Design, Tokyo", and the like. Teleconference server 130 may then include in data flow 211 the additional identifications, along with the identifications received in data flows 204-207, as choices for the caller to consider and indicate as the display name.

In some embodiments, the caller may decide to use an alternative identification (AID), which may be different from the identifications sent in data flow 211, as the display name. The caller may indicate that he/she intends to use the AID as the display name, and UE 20 may send such an indication along with the AID in data flow 211. For example, at the end of the presenting of the identifications to the caller, the voice may say "Or press or say zero and speak your name." The caller may press the '0' key on UE 20 and then speak to UE 20 "David Smith on behalf of John Smith at ABC Interior Design". The AID, i.e., "David Smith on behalf of John Smith at ABC Interior Design", may be sent in data flow 212. Display name resolution module 134 of teleconference server 130 may then designate the AID as the display name to identify or represent the caller in the teleconference. This may be a likely scenario when teleconference server 130 does not receive any identification from databases 151-154, or when teleconference server 130 analyzes and determines that none of the identifications is meaningful, as described above.

In some embodiments, teleconference server 130 may update corporate directory 153 after the display name is determined, as represented by data flow 213. Specifically, teleconference server 130 may transmit the display name to corporate directory 153, and the entry associated with the telephone number or the IP address in corporate directory 153 may be updated with the display name. This enables corporate directory 153 to keep track of the most recently used display name, and also increases the accuracy of the identification the corporate directory 153 may provide when queried with the same telephone number or IP address in the future.

In some embodiments, teleconference server 130 may be configured to receive an input from a participant of the teleconference to change or otherwise update the list of the participants that teleconference server 130 maintains. During the teleconference, a participant (e.g., a meeting organizer or administrator of the teleconference) may find that one of the participants, either the administrator himself/herself or some other participant, may be currently identified by a display name that is erroneous or meaningless. The administrator may then send a correct or updated display name for the participant using an interface such as human-machine interface 125 of FIG. 1. For example, participant P1 may find, after his/her device UE 121 receives the display name for IP-based telephone call 290 in data flow 210 for the first time, that the display name is erroneous or meaningless. Since participant P1 knows who the caller calling with IP-based telephone call 290 is, participant P1 may send an updated display name for IP-based telephone call 290 to teleconference server 130, represented by data flow 214 in FIG. 2, to identify the caller correctly. Teleconference server 130 may then broadcast the updated display name to all participants of the teleconference. Moreover, teleconference server 130 may update corporate directory 153 accordingly.

Example Server Components

Figure 3:
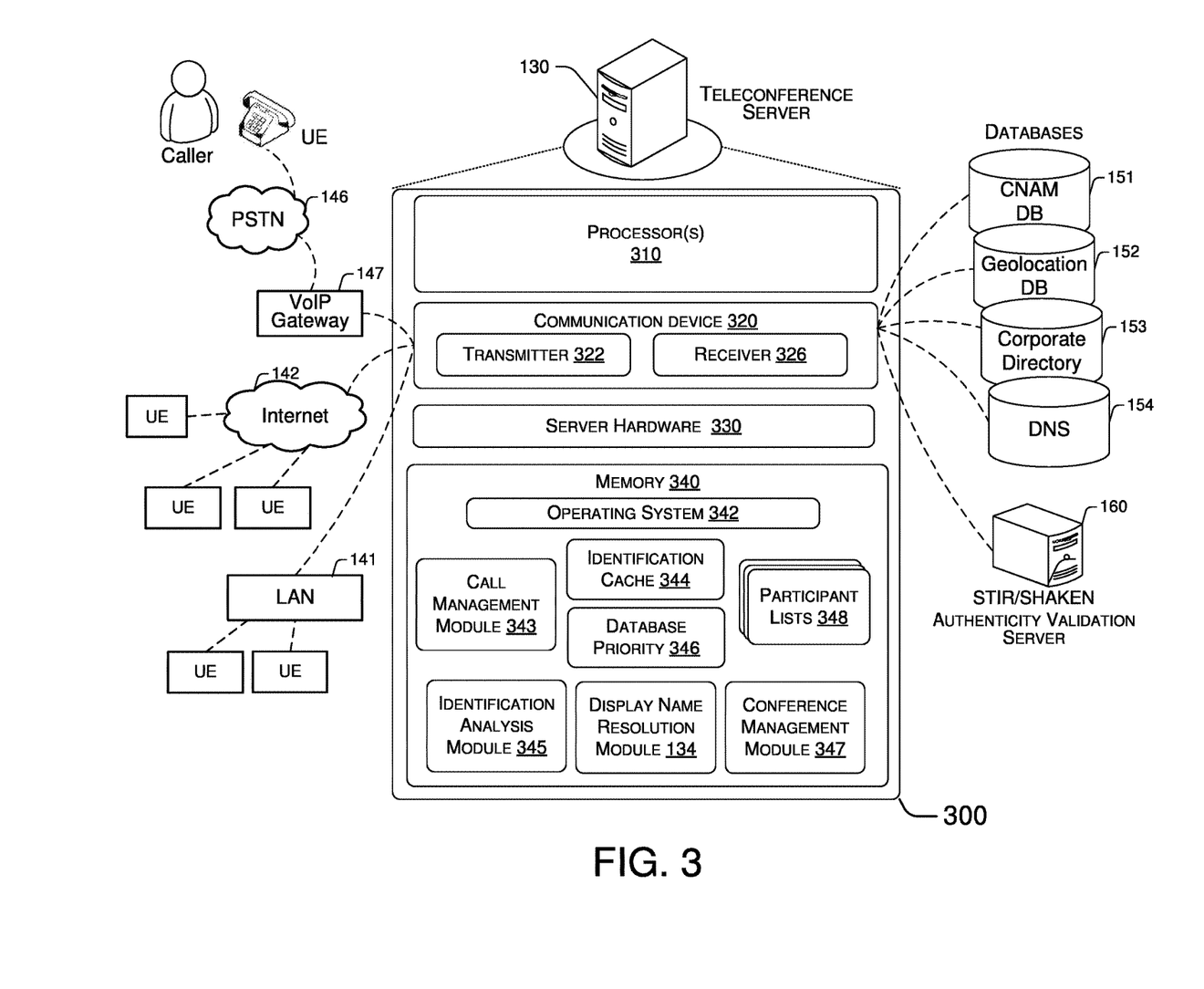
FIG. 3 is a block diagram showing various components of a teleconference server that is configured to host a teleconference and identify each participant of the teleconference.

FIG. 3 illustrates a block diagram 300 showing various components of teleconference server 130 that identifies a caller (e.g., caller 101 of FIG. 1) as an IP-based telephone call (e.g., IP-based telephone call 290 of FIG. 2) made by the caller is connected to a teleconference. As shown in FIG. 3, teleconference server 130 may include one or more processors 310, communication device 320, server hardware 330, and memory 340.

Communication device 320 may include wireless and/or wired communication hardware components, such as transmitter 322 and receiver 326, that enable teleconference server 130 to perform telecommunication and data communication with multiple communications networks. For example, communication device 320 may enable teleconference server 130 to transmit and receive voice or data via telecommunication and/or data communication networks such as LAN 141, Internet 142 and VoIP gateway. In some embodiments, communication device 320 may incorporate VoIP gateway 147 such that teleconference server 130 may be enabled to communicate with PSTN 146 directly. Moreover, through communication device 320, teleconference server 130 may query and receive responses from various databases, such as databases 151-154. Teleconference server 130 may also validate a received authentication certificate with STIR/SHAKEN validation server 160 via communication device 320. In short, communication device 320 may enable teleconference server 130 to perform each of the data flows in data flow chart 200 as shown in FIG. 2. In some embodiments, communication device 320 may include a human-machine interface so that an operator may configure or otherwise operate teleconference server 130 directly via the human-machine interface.

Server hardware 330 may include other hardware that is typically located in a telecommunication server. For example, server hardware 330 may include signal converters, transceivers, antennas, hardware decoders and encoders, graphic processors, a SIM card slot, and/or the like that enable teleconference server 130 to execute applications and collaborate with communication device 320 to provide telecommunication and data communication capabilities.

Memory 340 may be implemented using non-transitory computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

Memory 340 consists of programs or software procedures that, when executed by processor(s) 310, may enable teleconference server 130 to perform various functions as described above. As shown in FIG. 3, memory 340 may include an operating system 342, a call management module 343, an identification cache 344, an identification analysis module 345, database priority 346, display name resolution module 134, a conference management module 347, as well as participant lists 348. Operating system 342 may include components that manage or otherwise coordinate processor(s) 310 and server hardware 330 with software resources to perform various functions generally associated with an operating system.

Call management module 343 is configured to handle a telephone call before teleconference server 130 connects the telephone call to a teleconference. For example, call management module 343 may receive IP-based telephone call 290 of FIG. 2, and store the conference number, authentication certificate, telephone number, and/or IP address that are represented by data flow 201. In some embodiments, call management module 343 may also pass, via communication device 320, the authentication certificate to STIR/SHAKEN authenticity validation server 160 to validate the authentication of the authentication certificate, as described above. Call management module 343 may further query databases 151-154 with the telephone number and/or the IP address for identifications associated with the telephone number and/or the IP address, as described above.

Identification cache 344 is configured to store candidate identifications among which display name resolution module 134 may determine one as the display name of the telephone call. That is, identification cache 344 may store identifications obtained from databases 151-154 (as illustrated by data flows 204-207 of FIG. 2), an AID submitted from the caller (as illustrated by data flow 212 of FIG. 2), as well as an updated/corrected display name submitted by a participant of the teleconference (as illustrated by data flow 214 of FIG. 2). For each of the identifications obtained from databases 151-154, identification cache 344 may also store the respective timestamp, as well as the source of the identification (i.e., the name of the database that provides the identification).

Identification analysis module 345 is configured to analyze the candidate identifications stored in identification cache 344 for certain features of each of the candidate identifications. For example, identification analysis module 345 may analyze the identifications obtained from databases 151-154 and remove or otherwise filter out any irrelevant or meaningless identifications, as described above. Identification analysis module 345 may also analyze each identification and assign a respective completeness level, which represent a completeness of the respective identification, as described above.

Display name resolution module 134 is configured to designate one of the identifications stored in identification cache 344 as the display name. For example, display name resolution module 134 may designate one of the plurality of identifications obtained from databases 151-154 as the display name based on timestamps, completeness, and/or the predetermined priority of the databases (shown as database priority 346), as described in the procedures above. In some embodiments, display name resolution module 134 may further present the identifications obtained from databases 151-154 to the caller, and may receive either an indication of one of the identifications or an AID from the caller. In an event that the caller indicates one of the identifications he/she prefers, or provides an AID, display name resolution module 134 may designate the identification as indicated, or the AID, as the display name. In an event that neither a meaningful identification or an AID is provided, display name resolution module 134 may designate the telephone number or the IP-address of the telephone call as the display name.

Conference management module 347 is configured to manage one or more teleconferences that are concurrently hosted by teleconference server 130. Specifically, after display name resolution module 134 determines the display name, communication device 320 may connect the IP-based telephone call to other participants of the intended teleconference. Conference management module 347 may then maintain a participant list, such as one of participant lists 348. Each of participant lists 348 may store display names of participants of a respective one of the teleconference hosted by teleconference server 130. Each participant list may be identified by a unique conference number, as mentioned above. Conference management module 347 may maintain the participant list of the teleconference that telephone call 290 is connected to by transmitting the display name to calling devices that are being used by other participants to attend the teleconference. Moreover, in an event that an updated or corrected display name, as illustrated by data flow 213 of FIG. 2, is transmitted to teleconference server 130 from a UE associated with a participant of a specific teleconference, conference management module 347 may update the respective one of participant lists 348 to update the display name. In some embodiments, conference management module 347 may also update corporate directory 153 as described above.

Example Processes

Figure 4:
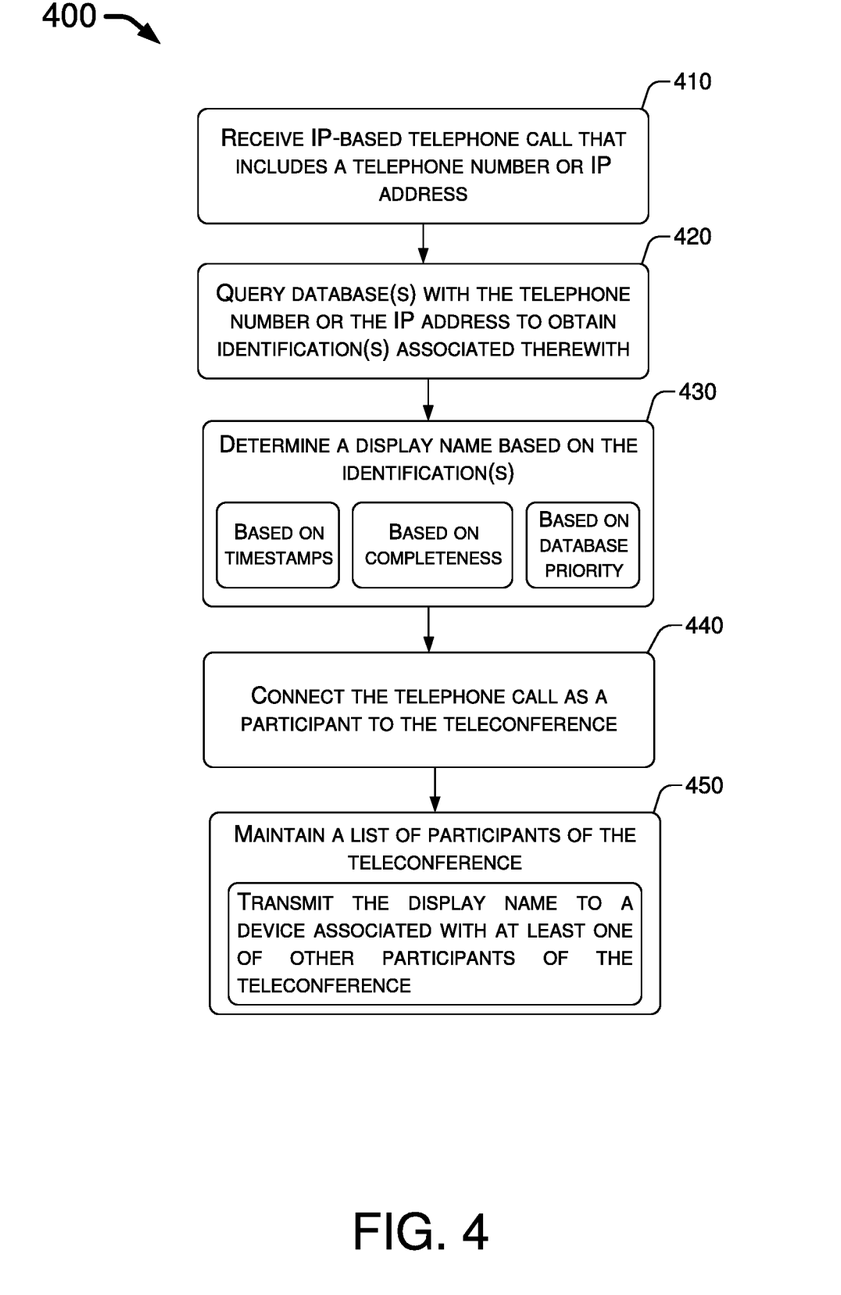
FIG. 4 is a flow diagram of an example process for joining a participant to a teleconference with the participant identified to other participants of the teleconference.
Figure 5:
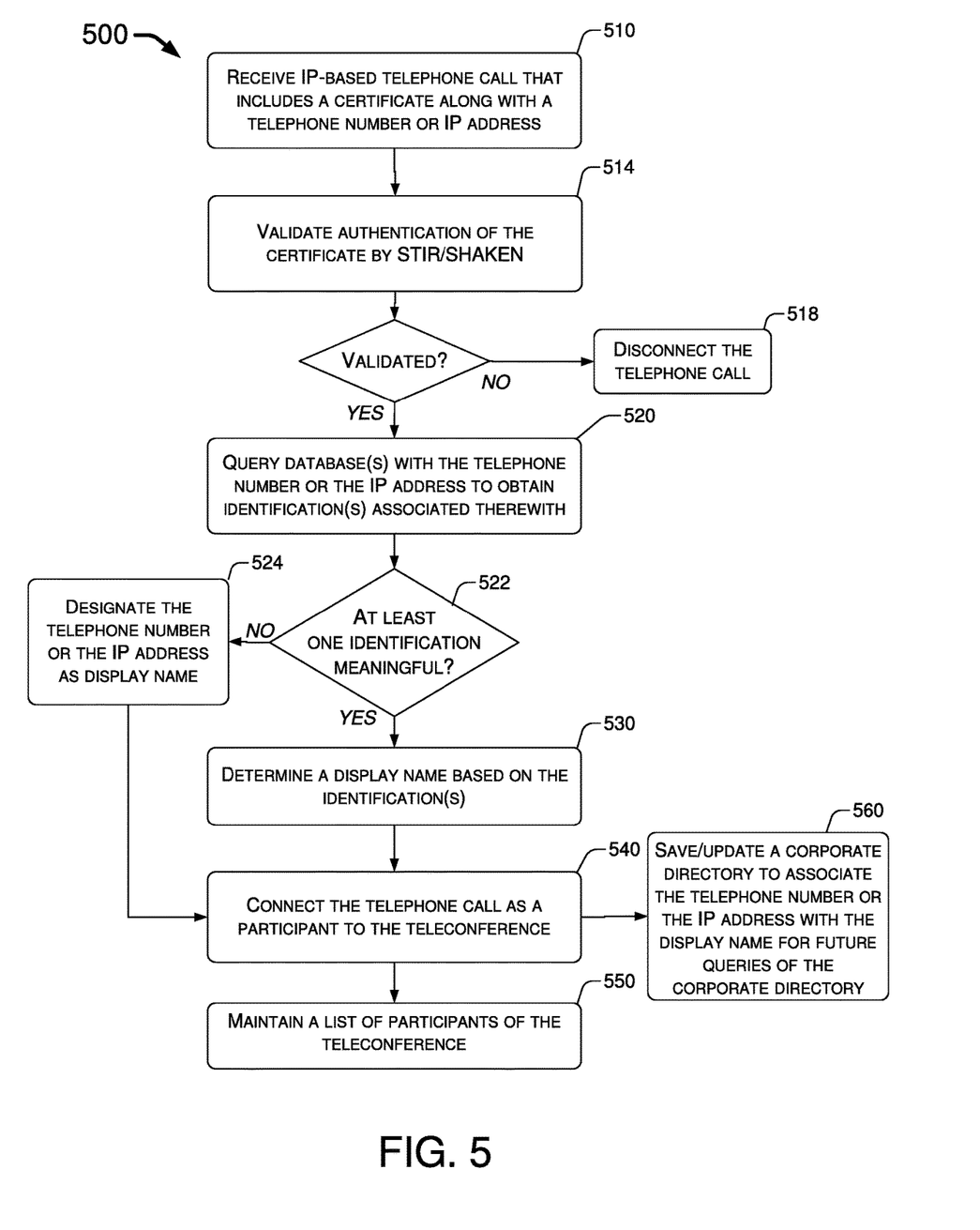
FIG. 5 is a flow diagram of another example process for joining a participant to a teleconference with the participant identified.
Figure 6:
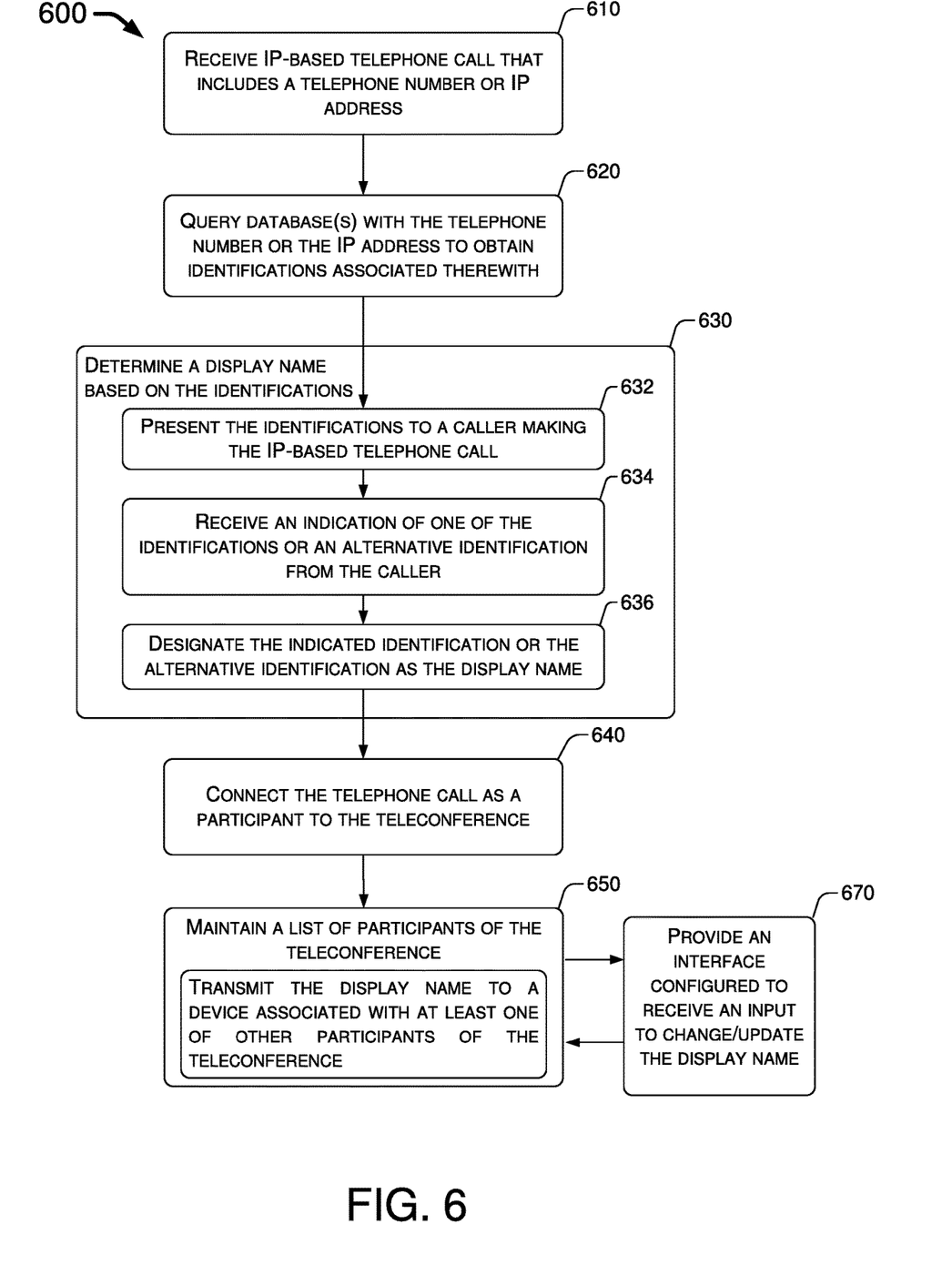
FIG. 6 is a flow diagram of yet another example process for joining a participant to a teleconference with the participant identified to other participants of the teleconference.

FIGS. 4-6 present illustrative processes 400-600 for providing participant identification of a teleconference. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 400-600 are described with reference to telecommunication network 100 of FIG. 1, data flow chart 200 of FIG. 2, as well as block diagram 300 of FIG. 3.

FIG. 4 is a flow diagram of an example process 400 for joining a participant to a teleconference with the participant identified to other participants of the teleconference. Process 400 may begin at block 410.

At block 410, teleconference server 130 may receive IP-based telephone call 290 initiated by a calling device, UE 20. IP-based telephone call 290 may include a telephone number or an IP address that is associated with IP-based telephone call 290. Process 400 may proceed from block 410 to block 420.

At block 420, teleconference server 130 may query one or more of databases 151-154 with the telephone number or the IP address, and subsequently obtain from the databases one or more identifications (e.g., identifications transmitted in data flows 204-207) associated with the telephone number or the IP address. Process 400 may proceed from block 420 to block 430.

At block 430, teleconference server 130 may determine a display name for IP-based telephone call 290 based on the one or more identifications. In some embodiments, teleconference server 130 may determine the display name based on a respective timestamp of each of the identifications. For example, display name resolution module 134 of teleconference server 130 may designate one of the identifications that has a later timestamp as the display name. In some embodiments, teleconference server 130 may determine the display name based on a respective completeness of each of the identifications. For example, display name resolution module 134 of teleconference server 130 may designate one of the identifications that is determined by identification analysis module 345 to have a higher completeness level as the display name. In some embodiments, teleconference server 130 may determine the display name based on a predetermined priority of the databases (i.e., database priority 346) from which the identifications are obtained from. For example, display name resolution module 134 of teleconference server 130 may designate one of the identifications that is obtained from a more preferred database, according to database priority 346, as the display name. Process 400 may proceed from block 430 to block 440.

At block 440, teleconference server 130 may connect IP-based telephone call 290 as a participant to a teleconference that includes one or more other participants (e.g., participants P1, P2, P3 and P4). Process 400 may proceed from block 440 to block 450.

At block 450, teleconference server 130 may maintain a list of participants of the teleconference, such as one of participant lists 348 of FIG. 3. Specifically, conference management module 347 of teleconference server 130 may transmit the display name to a device associated with at least one of the one or more other participants of the teleconference, as illustrated by data flow 210 of FIG. 2.

FIG. 5 is a flow diagram of an example process 500 for joining a participant to a teleconference with the participant identified. Process 500 may begin at block 510.

At block 510, teleconference server 130 may receive IP-based telephone call 290 initiated by a calling device, UE 20. IP-based telephone call 290 may include a telephone number or an IP address that is associated with IP-based telephone call 290. IP-based telephone call 290 may also include a certificate, i.e., an authentication certificate. Process 500 may proceed from block 510 to block 514.

At block 514, teleconference server 130 may validate an authentication of the certificate by using STIR/SHAKEN. Specifically, call management module 343 of teleconference server 130 may transmit the certificate to STIR/SHAKEN authenticity validation server 160. STIR/SHAKEN authenticity validation server 160 may return a validation back to call management module 343 indicating whether the certificate is authentic. In an event that the certificate is validated to be authentic, process 500 may proceed from 514 to 520. In an event that the certificate is not validated to be authentic, process 500 may proceed from block 514 to block 518.

At block 518, call management module 343 may disconnect IP-based telephone call 290 from teleconference server 130. Alternatively, call management module 343 may connect IP-based telephone call 290 to teleconference server 130 with IP-based telephone call 290 labeled or otherwise indicated as "having an unvalidated authentication certificate".

At block 520, teleconference server 130 may query one or more of databases 151-154 with the telephone number or the IP address, and subsequently obtain from the databases one or more identifications, as illustrated in data flows 205-207, that are associated with the telephone number or the IP address. The identifications may be stored in identification cache 344 of FIG. 3. Process 500 may proceed from block 520 to block 522.

At block 522, teleconference server 130 may analyze the one or more identifications to determine whether the one or more identifications are meaningful or not. For example, identification analysis module 345 of teleconference server 130 may analyze the identification(s) received in data flows 205-207 to search for a person's name, a business name, a geolocation, or a network domain name. If identification analysis module 345 determines that an identification is either a person's name, a business name, a geolocation, or a network domain name, then the processor may determine that the identification is meaningful. Otherwise, identification analysis module 345 may determine that the identification is not meaningful. In the event that at least one of the identifications is determined meaningful, process 500 may proceed from block 522 to block 530. In the event that none of the identifications is determined meaningful, process 500 may proceed from block 522 to block 524.

At block 524, display name resolution module 134 may designate the telephone number or the IP address of IP-based telephone call as the display name. Process 500 may proceed from block 524 to block 540.

At block 530, display name resolution module 134 may determine a display name for IP-based telephone call 290 based on the one or more identifications. For example, display name resolution module 134 may determine the display name based on a respective timestamp or a respective completeness of each of the identifications. In some embodiments, display name resolution module 134 may determine the display name based on a predetermined priority of the databases (i.e., database priority 356) from which the identifications are obtained from. Process 500 may proceed from block 530 to block 540.

At block 540, teleconference server 130 may connect IP-based telephone call 290 as a participant to a teleconference that includes one or more other participants (e.g., participants P1, P2, P3 and P4). Process 500 may proceed from block 540 to block 550. Process 500 may also proceed from block 540 to block 560.

At block 550, teleconference server 130 may maintain a list of participants of the teleconference (e.g., one of participant lists 348). Specifically, conference management module 347 of teleconference server 130 may transmit the display name to a device associated with at least one of the one or more other participants of the teleconference, as illustrated by data flow 210 of FIG. 2. In some embodiments, conference management module 347 may label the display name as "STIR/SHAKEN-validated" such that the one or more other participants would be informed that IP-based telephone call 290 has an authentication certificate that has been validated by a STIR/SHAKEN validation server such as STIR/SHAKEN authenticity validation server 160.

At block 560, conference management module 347 may save or update an entry in corporate directory 153 to associate the telephone number or the IP address with the display name for future queries of corporate directory 153.

FIG. 6 is a flow diagram of an example process 600 for joining a participant to a teleconference with the participant identified to other participants of the teleconference. Process 600 may begin at block 610.

At block 610, teleconference server 130 may receive IP-based telephone call 290 initiated by a calling device, UE 20. IP-based telephone call 290 may include a telephone number or an IP address that is associated with IP-based telephone call 290. Process 600 may proceed from block 610 to block 620.

At block 620, teleconference server 130 may query one or more of databases 151-154 with the telephone number or the IP address, and subsequently obtain from the databases a plurality of identifications (e.g., identifications transmitted in data flows 204-207) associated with the telephone number or the IP address. Process 600 may proceed from block 620 to block 630. Specifically, process 600 may proceed from block 620 to sub-block 632 of block 630.

At block 630, teleconference server 130 may determine a display name for IP-based telephone call 290 based on the plurality of identifications. Block 630 may include sub-blocks 632, 634 and 636. Process 600 may proceed from block 630 to block 640.

At sub-block 632, display name resolution module 134 of teleconference server 130 may present the plurality of identifications to a caller (e.g., caller 101) who makes IP-based telephone call 290. In some embodiments, the plurality of identifications may be presented to the caller in an audio form, such as a voice signal. For example, identifications in data flow 211 may be presented to caller 101 in an audio form. Process 600 may proceed from sub-block 632 to sub-block 634.

At sub-block 634, teleconference server 130 may receive, from the caller, an indication of one of the plurality of identifications, or an AID, intended by the caller to represent the caller in the teleconference. In some embodiments, the indication or the AID may be represented by a voice generated by the caller. For example, data flow 212 may include a voice signal representing an indication or an AID that caller 101 intends to use as the display name to represent himself/herself in the teleconference. Process 600 may proceed from sub-block 634 to sub-block 636.

At sub-block 636, display name resolution module 134 may designate the indicated identification or the AID as the display name. Process 600 may proceed from sub-block 636 to block 640.

At block 640, teleconference server 130 may connect IP-based telephone call 290 as a participant to a teleconference that includes one or more other participants (e.g., participants P1, P2, P3 and P4). Process 600 may proceed from block 640 to block 650.

At block 650, teleconference server 130 may maintain a list of participants of the teleconference, such as one of participant lists 348 of FIG. 3. Specifically, conference management module 347 of teleconference server 130 may transmit the display name to a device associated with at least one of the one or more other participants of the teleconference, as illustrated by data flow 210 of FIG. 2. Process 600 may proceed from block 650 to block 670.

At block 670, an interface (e.g., human-machine interface 125 of FIG. 1) may be provided to receive an input from an administrator or a participant (e.g., participant P4) of the teleconference to change or update the display name for the teleconference. Process 600 may proceed from block 670 to block 650.

CONCLUSION

The ability for a client-based teleconferencing service to identify a caller calling into a meeting in a timely manner is crucial to the operation efficiency of the meeting. The techniques described in the present application enable a teleconference server that is able to identify the caller without a need for the caller to identify himself/herself, thereby greatly shortening the time for the caller to be admitted to the meeting as a new participant. Moreover, this ability enables other participants of the meeting to be informed of the identity of a new participant as soon as he/she joins the meeting, as if all the participants were meeting face-to-face. As a consequence, the meeting can be run seamlessly without wasting time of all the participants in identifying a new participant every time a new participant joins the meeting. The saved time and enhanced efficiency result in lower operation cost and improved user experience of teleconferencing provided by the teleconference server.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
receiving an Internet Protocol (IP)-based telephone call initiated by a calling device, wherein the IP-based telephone call includes a telephone number or an IP address;
querying one or more databases with the telephone number or the IP address to obtain one or more identifications associated with the telephone number or the IP address;
determining a display name for the IP-based telephone call based on the one or more identifications, wherein the one or more identifications comprise a plurality of identifications, and wherein the determining of the display name comprises designating one of the plurality of identifications as the display name based on a respective completeness of each of the plurality of identifications;
connecting the IP-based telephone call as a participant to a teleconference that includes one or more other participants; and
maintaining a list of participants of the teleconference, wherein the maintaining of the list of participants includes transmitting the display name to a device associated with at least one of the one or more other participants of the teleconference.

2. The computer-implemented method of claim 1, wherein the one or more databases comprise a Caller Identification Name (CNAM) database, a corporate directory, or a geolocation database, and wherein the one or more identifications comprise a person's name or a business name under which the calling device is registered in the CNAM database, a person's name or a business name with which the telephone number or the IP address is associated in the corporate directory, or a geolocation with which the telephone number or the IP address is associated in the geolocation database.

3. The computer-implemented method of claim 1, wherein the calling device comprises a Public Switched Telephone Network (PSTN) telephone, a cellular telephone, or an IP-based calling device.

4. The computer-implemented method of claim 1, wherein the IP-based telephone call further includes a certificate, the computer-implemented method further comprising:
validating an authentication of the certificate by Secure Telephony Identity Revisited and Secure Handling of Asserted Information using Tokens (STIR/SHAKEN), wherein the transmitting of the display name includes labeling the display name as STIR/SHAKEN-validated.

5. The computer-implemented method of claim 1, further comprising:
analyzing the one or more identifications to determine whether the one or more identifications are meaningful; and
designating, in an event that none of the one or more identifications is determined meaningful, the telephone number or the IP address as the display name.

6. The computer-implemented method of claim 1, further comprising:
providing an interface configured to receive an input from an administrator or a participant of the teleconference to change or update the display name for the teleconference.

7. The computer-implemented method of claim 1, wherein the calling device comprises a computer, wherein the IP-based telephone call includes an IP address of the computer, wherein the one or more databases comprise a domain name system (DNS), and wherein the one or more identifications comprise a domain name associated with the IP address.

8. The computer-implemented method of claim 1, wherein the one or more identifications comprise a plurality of identifications, and wherein the determining of the display name comprises designating one of the plurality of identifications as the display name based on a respective timestamp of each of the plurality of identifications.

9. The computer-implemented method of claim 1, wherein the one or more databases comprise a plurality of databases, wherein the one or more identifications comprise a plurality of identifications obtained from the plurality of databases, and wherein the determining of the display name comprises designating one of the plurality of identifications as the display name based on a predetermined priority of the plurality of databases.

10. The computer-implemented method of claim 1, wherein the one or more identifications comprise a plurality of identifications, and wherein the determining of the display name comprises:
presenting the plurality of identifications to a caller making the IP-based telephone call;
receiving, from the caller, an indication of one of the plurality of identifications, or an alternative identification, intended by the caller to represent the caller in the teleconference; and
designating the indicated identification or the alternative identification as the display name.

11. The computer-implemented method of claim 10, wherein the presenting of the plurality of identifications comprises presenting, via the IP-based telephone call, the plurality of identifications in an audio form, and wherein the receiving of the indication or the alternative identification comprises receiving, via the IP-based telephone call, the indication or the alternative identification represented by a voice generated by the caller.

12. The computer-implemented method of claim 1, further comprising:
saving or updating, in response to the determining of the display name, an entry in a corporate directory to associate the telephone number or the IP address with the display name for future queries of the corporate directory.

13. One or more non-transitory computer-readable media storing computer-executable instructions which, when executed by one or more processors of a teleconference server, direct the teleconference server to:
  receive an Internet Protocol (IP)-based telephone call initiated by a calling device, wherein the IP-based telephone call includes an associated telephone number;
  query one or more databases with the telephone number to obtain one or more identifications associated with the telephone number;
  determine a display name for the IP-based telephone call based on the one or more identifications, wherein the one or more identifications comprise a plurality of identifications, and wherein the determining of the display name comprises designating one of the plurality of identifications as the display name based on a respective completeness of each of the plurality of identifications;
  connect the IP-based telephone call as a participant to a teleconference that includes one or more other participants; and
  maintain a list of participants of the teleconference, wherein instructions to maintain the list of the participants includes instructions to transmit the display name to a device associated with at least one of the one or more other participants of the teleconference.

14. The one or more non-transitory computer-readable media of claim 13, wherein the one or more databases comprise a Caller Identification Name (CNAM) database, a corporate directory, or a geolocation database, and wherein the one or more identifications comprise a person's name or a business name under which the calling device is registered in the CNAM database, a person's name or a business name with which the telephone number is associated in the corporate directory, or a geolocation with which the telephone number is associated in the geolocation database.

15. The one or more non-transitory computer-readable media of claim 13, wherein the IP-based telephone call further includes a certificate, and wherein the computer-executable instructions further direct the teleconference server to:
  authenticate the certificate by Secure Telephony Identity Revisited and Secure Handling of Asserted Information using Tokens (STIR/SHAKEN).

16. The one or more non-transitory computer-readable media of claim 13, wherein the one or more identifications comprise a plurality of identifications, and wherein the instructions to determine the display name comprises instructions to designate one of the plurality of identifications as the display name based on a respective timestamp or completeness of each of the plurality of identifications.

17. The one or more non-transitory computer-readable media of claim 13, wherein the computer-executable instructions further direct the teleconference server to:
  save or update an entry in a corporate directory to associate the telephone number with the display name for future queries by the teleconference server.

18. A teleconference server, comprising:
  one or more processors; and
  memory having instructions stored therein, wherein the instructions, when executed by the one or more processors, cause the one or more processors to:
  receive an Internet Protocol (IP)-based telephone call initiated by a calling device operated by a caller, wherein the IP-based telephone call includes an associated telephone number or IP address;
  query one or more databases with the telephone number or the IP address to obtain one or more identifications associated with the telephone number or the IP address;
  determine a display name for the IP-based telephone call based on the one or more identifications, wherein the one or more identifications comprise a plurality of identifications, and wherein the determining of the display name comprises designating one of the plurality of identifications as the display name based on a respective completeness of each of the plurality of identifications;
  connect the IP-based telephone call to a teleconference that includes one or more other participants such that the caller joins the teleconference via the IP-based telephone call and under the display name as identified by the one or more other participants; and
  maintain a list of participants of the teleconference, wherein instructions to maintain the list of the participants includes instructions to transmit the display name to a device associated with at least one of the one or more other participants of the teleconference,
  wherein the one or more databases comprise a Caller Identification Name (CNAM) database, a corporate directory, a geolocation database, or a domain name system (DNS), and wherein the one or more identifications comprise a person's name or a business name under which the calling device is registered in the CNAM database, a person's name or a business name with which the telephone number or the IP address is associated in the corporate directory, a geolocation with which the telephone number or the IP address is associated in the geolocation database, or a domain name with which the IP address is associated in the DNS.

19. The teleconference server of claim 18, wherein the one or more identifications comprise a plurality of identifications, and wherein the instructions further cause the one or more processors to:
  present the plurality of identifications to the caller in an audio form via the IP-based telephone call;
  receive an audio signal from the caller via the IP-based telephone call, the audio signal representing an indication of one of the plurality of identifications, or an alternative identification, intended by the caller to represent the caller in the teleconference; and
  designate the indicated identification or the alternative identification as the display name.

* * * * *